United States Patent
Figlioli et al.

(12) 
(10) Patent No.: US 8,794,671 B1
(45) Date of Patent: Aug. 5, 2014

(54) ANTI-UNLOCKING DEVICE FOR ADJUSTABLE STEERING COLUMN

(71) Applicant: GM Global Technology Operations LLC, Detroit, MI (US)

(72) Inventors: Dan W. Figlioli, Macomb Township, MI (US); Kristina M Dewilde, Shelby Township, MI (US); Brian J. Putala, Milford, MI (US); Michael P. Phillips, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/785,431

(22) Filed: Mar. 5, 2013

(51) Int. Cl.
*B62D 1/18* (2006.01)

(52) U.S. Cl.
USPC .......................................... 280/775

(58) Field of Classification Search
CPC ........ B62D 1/184; B62D 1/195; B62D 1/187; B62D 1/18
USPC ...................... 280/775, 777, 779; 74/492, 493
See application file for complete search history.

(56) References Cited

U.S. PATENT DOCUMENTS

| | | | | |
|---|---|---|---|---|
| 7,735,391 B2* | 6/2010 | Osawa et al. | ................... | 74/493 |
| 7,861,615 B2* | 1/2011 | Harris et al. | ................... | 74/493 |
| 7,882,761 B2* | 2/2011 | Cymbal et al. | ................... | 74/493 |
| 8,056,436 B2* | 11/2011 | Marable et al. | ................. | 74/493 |
| 8,327,733 B2* | 12/2012 | Ozsoylu et al. | ................. | 74/493 |
| 8,376,404 B2* | 2/2013 | Tinnin et al. | ................... | 280/777 |
| 2006/0090586 A1* | 5/2006 | Lee | .............................. | 74/492 |
| 2012/0125139 A1 | 5/2012 | Tinnin et al. | | |
| 2012/0125140 A1 | 5/2012 | Ridgway et al. | | |
| 2012/0126521 A1 | 5/2012 | Tinnin et al. | | |

FOREIGN PATENT DOCUMENTS

WO   WO 2008056711 A1 *  5/2008  ............. B62D 1/184

* cited by examiner

*Primary Examiner* — Faye M. Fleming
(74) *Attorney, Agent, or Firm* — Quinn Law Group, PLLC

(57) ABSTRACT

An adjustable steering column assembly includes a steering column and a lever moveable between an unlocked position and a locked position. The position of the steering column is adjustable when the lever is in the unlocked position and fixed when the lever is in the locked position. An anti-unlocking device is provided to prevent the lever from moving to the unlocked position from the locked position when a first force is applied to the steering column. The anti-unlocking device prohibits adjustment of the steering column when a first force is applied to the steering column. An example anti-unlocking device may include a member defining a slot, with the lever being at least partially insertable in the slot in the unlocked and locked positions. The member includes a wall defining a ramp surface configured to abut at least one surface of the lever when the first force is applied.

18 Claims, 3 Drawing Sheets

ANTI-UNLOCKING DEVICE FOR ADJUSTABLE STEERING COLUMN

TECHNICAL FIELD

The disclosure relates generally to an adjustable steering column assembly and to an anti-unlocking device for the steering column.

BACKGROUND

Steering columns for motor vehicles are often provided with mechanisms for adjusting the steering column's position by an operator of the vehicle. Available adjustments typically include a tilt or rake adjustment in which an angular position of the steering column is changed relative to the operator, and a telescoping adjustment in which the steering column is extended toward or away from the operator. The steering column may be configured to absorb energy in an impact situation. In a vehicle impact situation, the steering column should remain in a fixed position in order to allow optimal performance of the energy absorption function as well as other functions of the steering column.

SUMMARY

An adjustable steering column assembly includes a steering column having an adjustable column position. The column position of the steering column may be adjustable in a direction substantially perpendicular (i.e. rake direction) to a column axis defined by the steering column. The column position of the steering column may be adjustable in a direction substantially parallel (i.e. telescopic direction) to the column axis. A lever is operatively connected to the steering column and moveable between an unlocked position and a locked position. The column position of the steering column is adjustable when the lever is in the unlocked position and fixed when the lever is in the locked position.

An anti-unlocking device is provided to prevent the lever from moving to the unlocked position from the locked position when a sufficient first force is applied to the steering column, such as during an impact event. The minimum amount of force F required may be varied based on the particular application at hand. The anti-unlocking device includes a member operatively connected to the steering column. The member defines a slot having a first end and a second end, the lever being at least partially insertable in the slot in both the unlocked position and the locked position. The member is configured to move relative to the lever when the first force is applied to the steering column, thereby preventing the lever from moving to the unlocked position from the locked position.

The second end of the slot may be configured to be narrower than the first end of the slot, thereby preventing motion of the lever in a direction substantially parallel to the pivot axis. The slot in the member defines a first side and a second side extending between the first and second ends of the slot. A wall may be positioned on at least one of the first and second sides of the slot. The wall defines a ramp surface configured to abut at least one surface of the lever when the first force is applied to the steering column, thereby preventing motion of the lever in a first direction substantially perpendicular to the pivot axis. The wall defines a ramp angle relative to the column axis. In one example, the ramp angle is approximately between 5 and 30 degrees.

The first side of the slot in the member may define a first segment, second segment and a third segment. The second segment may be contiguous with the first and second segments. The first and third segments may be substantially flat relative to the column axis and the second segment may be substantially angled relative to the column axis. The second side of the slot may define the wall, a fourth segment and a fifth segment. The fifth segment may be substantially flat relative to the column axis and the wall and fourth segment may be substantially angled relative to the column axis.

In one embodiment, the lever may be spaced from the second end of the slot after the first force is applied to the steering column. After a second force is applied to the steering column, a portion of the lever may abut the second end of the slot. In another embodiment, a portion of the lever may abut the second end of the slot after the first force is applied to the steering column.

The lever may include a base portion and an extended portion contiguous with the base portion. The extended portion defines an extension height smaller than a height of the base portion. The extended portion defines a first lever surface configured to abut the ramp surface of the member when the first force is applied to the steering column, thereby preventing motion of the lever in a direction substantially perpendicular to the pivot axis.

The lever may define a first arm portion, a second arm portion and a thumb or finger pad portion. The second arm portion may be substantially angled relative to the first arm portion. The second arm portion of the lever may include a chamfered edge configured to guide the second arm portion through the slot.

The member may be formed as a separate component and attached to a shroud that is configured to at least partially encapsulate the steering column. Alternatively, the member may be integrally formed with a shroud that is configured to at least partially encapsulate the steering column.

The above features and advantages and other features and advantages of the present invention are readily apparent from the following detailed description of the best modes for carrying out the invention when taken in connection with the accompanying drawings.

DETAILED DESCRIPTION

Figure 1:
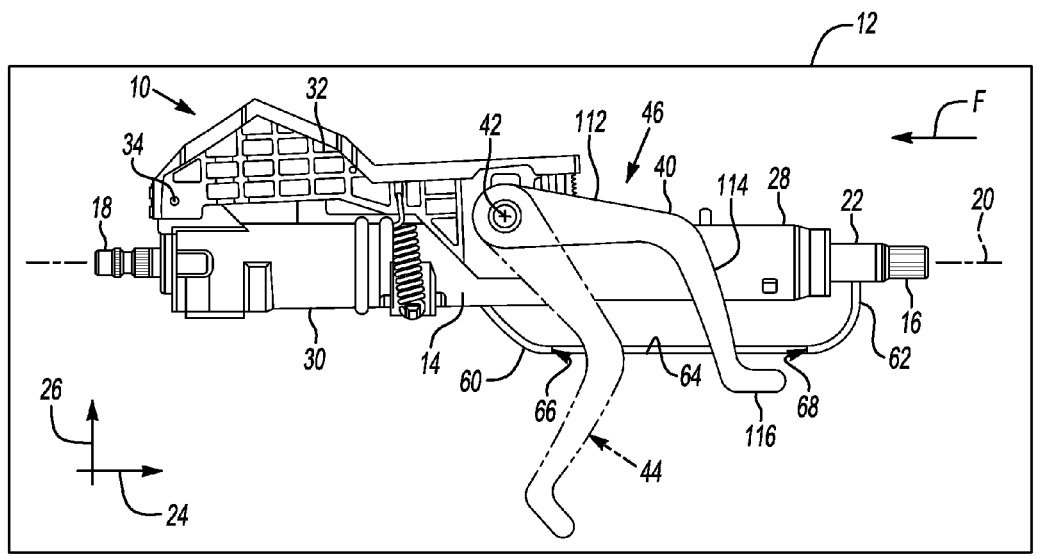
FIG. 1 is a schematic side view of a steering column assembly having a lever and a member configured as an anti-unlocking device.

Referring to the Figures, wherein like reference numbers refer to the same or similar components throughout the several views, FIG. 1 is a schematic side view of a steering column assembly 10 for a vehicle 12. The assembly 10 includes a steering column 14 having a first end 16 to which a steering wheel (not shown) is operatively connected. The steering column 14 defines a column axis 20. Referring to FIG. 1, the steering column 14 has a second end 18 that is operatively connected to a steering mechanism (not shown) that translates the rotational motion of the steering column 14 about the column axis 20 into steering motion of the vehicle 12.

Referring to FIG. 1, the position 22 of the steering column 14 is adjustable in at least one direction. In one embodiment, the steering column 14 is adjustable in a telescope direction 24 that is substantially parallel to the column axis 20, allowing extension of the column 14 towards or away from the operator. In another embodiment, the steering column 14 is adjustable in a rake direction 26 that is substantially perpendicular to the column axis 20, allowing angular adjustment in up and down directions. In another embodiment, the steering column 14 is adjustable in both the telescope and rake directions 24, 26.

Referring to FIG. 1, a lever 40 is operatively connected to the steering column 14. The lever 40 is moveable between an unlocked position 44 (shown in phantom) and a locked position 46. For example, the lever may be pivotable about a pivot axis 42 (extending out of the page) between the unlocked and locked positions 44, 46. The position 22 of the steering column 14 may be adjustable when the lever is in the unlocked position 44 and fixed when the lever 40 is in the locked position 46.

Referring to FIG. 1, in one non-limiting example, the adjustment in the telescope direction 24 may be made by releasing the lever 40 to the unlocked position 44, which then allows for movement of a first sleeve 28 of the steering column 14 relative to a second sleeve 30 along the column axis 20. The first sleeve 28 is moveable within and at least partially located in the second sleeve 30, which extends from the second end 18 towards the first end 16 of the assembly 10. Returning the lever 40 to the locked position 46 retains the first sleeve 28 in a desired set position relative to the second sleeve 30. This configuration may be reversed such that the second sleeve 30 is moveable within and at least partially located in the first sleeve 28. Referring to FIG. 1, the second sleeve 30 may be secured to a rake bracket 32 at a pivot 34.

Figure 2:
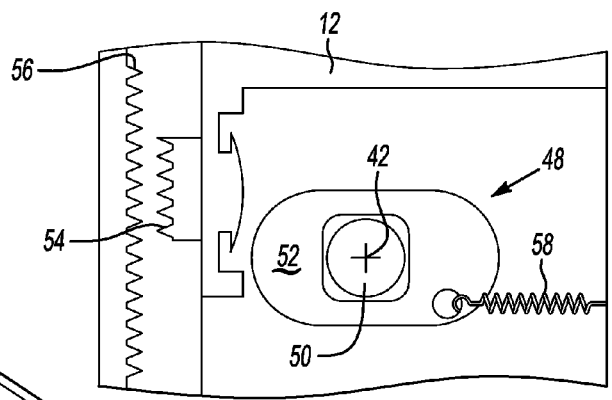
FIG. 2 is a schematic fragmentary diagram of a lever lock mechanism for the lever of FIG. 1.

One example of a lever lock mechanism 48 that may be employed for the lever 40 is illustrated in FIG. 2 and described below. The lever lock mechanism 48 shown in FIG. 2 is intended only as a non-limiting example. Any suitable type of lever lock mechanism known to those skilled in the art may be employed. FIG. 2 shows the same view as FIG. 1, with the pivot axis 42 extending out of the page. Referring to FIG. 2, the lever 40 may be connected to a locking bolt 50 which is operatively connected to at least one cam member 52. When the lever 40 is rotated to the locked position 46, shown in FIG. 1, the locking bolt 50 is rotated such that the cam member 52 frictionally engages portions of the steering column 14 to hold the position 22 of the steering column 14. When the lever 40 is rotated to an unlocked position 44 shown in FIG. 1, the locking bolt 50 rotates such that the frictional engagement of the cam member 52 to the steering column 14 is released, thereby allowing a change in the position 22 of the steering column 14. The assembly 10 may include at least one pair of opposing teeth 54, 56 configured to engage when the lever 40 is rotated to the locked position 46 and disengage when the lever 40 is rotated to the unlocked position 44. The assembly 10 may include a spring 58 operatively connected to the steering column 14 to provide a biasing force to either engage or disengage the opposing teeth 54, 56.

Referring to FIGS. 1 and 3-8, the assembly 10 includes a member 60 operatively connected to the steering column 14. Referring to FIG. 1, the member 60 is configured as an anti-unlocking device to prevent the lever 40 from pivoting to the unlocked position 44 from the locked position 46 when a sufficient first (or second, third, etc.) force F is applied to the steering column 14, such as during an impact event. The minimum amount of force F required may be varied based on the particular application at hand. As will be described, the member 60 is tunable as to the magnitude of the force F required to trap the lever 40 in the locked position 46.

Figure 3:
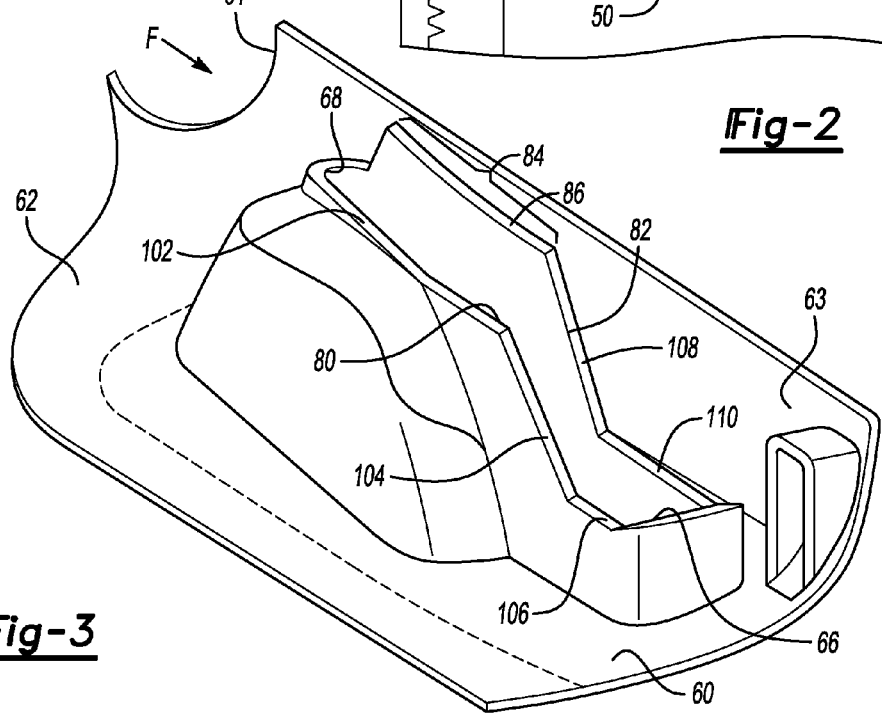
FIG. 3 is a schematic fragmentary perspective view of the member of FIG. 1, with the lever removed for clarity.

FIG. 3 is a schematic fragmentary perspective view of the member 60, with the lever 40 removed for clarity. Referring to FIG. 3, the member 60 may be integrally formed with a shroud 62 that is configured to at least partially encapsulate the steering column 14. Referring to FIG. 3, the shroud 62 may include an aperture 61 for seating the steering column 14 as well as sidewalls 63 that extend to connect to the steering column 14. Alternatively, the member 60 may be formed as a separate component and attached to the shroud 62.

Figure 4:
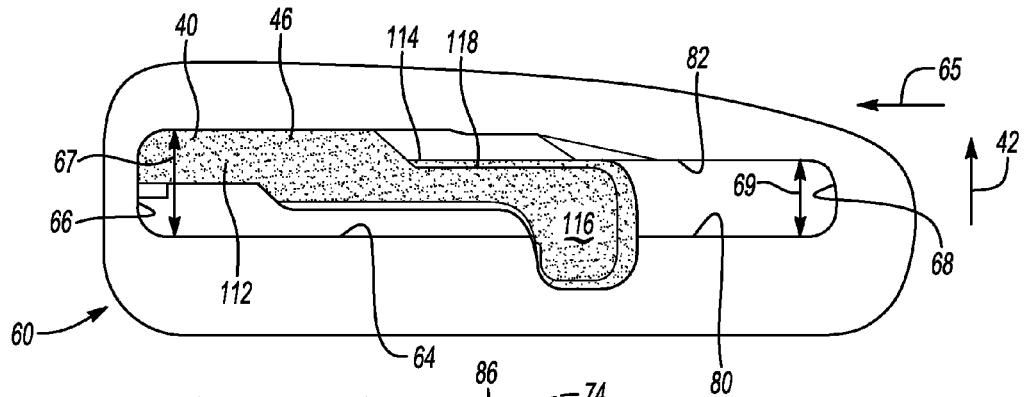
FIG. 4 is a schematic fragmentary bottom view of the lever and member of FIG. 1 (shown from an underside of the member)

FIG. 4 is a schematic fragmentary view of the member 60 and lever 40 in the normal locked position 46 (prior to the first force F being applied to the steering column 14), shown from a bottom view of the member 60. For clarity, the lever 40 is shaded in FIGS. 4-6. Referring to FIGS. 3-4, the member 60 defines a slot 64 having a first end 66 and a second end 68. Referring to FIG. 1, the lever 40 is at least partially inserted in the slot 64 in both the unlocked and the locked positions 44, 46 (shown in FIG. 1).

In an impact situation, if a force is applied to the steering column 14, the force is transferred along the column axis 20 into the member 60. Referring to FIG. 4, the member 60 is configured to move relative to the lever 40 (in a direction 65) when the first force F is applied to the steering column 14. As the member 60 moves relative to the lever 40 in the direction 65, the relative position of the lever 40 moves towards the second end 68 of the slot 64 (opposite to the direction 65). In the embodiment shown, the direction 65 is substantially parallel to the column axis 20 and substantially perpendicular to the pivot axis 42.

Referring to FIG. 4, the first end 66 of the slot 64 defines a first width 67 and the second end 68 defines a second width 69. Referring to FIG. 4, the second end 68 of the slot 64 may be configured to be narrower than the first end 66 of the slot 64, thereby preventing motion of the lever 40 along a direction that is substantially parallel to the pivot axis 42. Stated differently, the width 69 may be configured to be less than width 67. The pivot axis 42 may be parallel to the cross-vehicle axis. The orientation of the member 60 may be changed based on the location of the lever 40 in the particular application.

Figure 5:
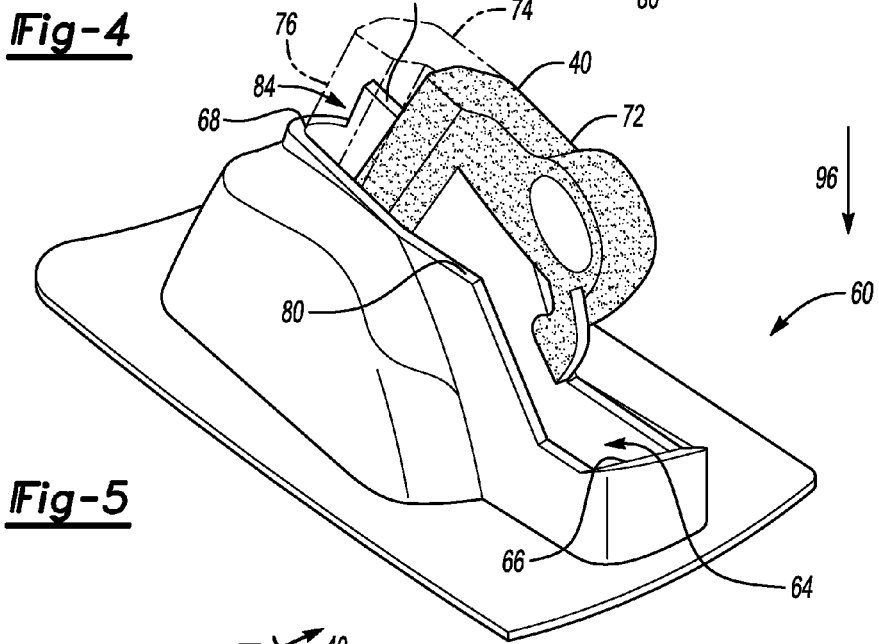
FIG. 5 is a schematic fragmentary perspective view of the lever and member of FIG. 1.

FIG. 5 is a schematic fragmentary perspective view of the lever 40 and member 60 after the first force F is applied to the steering column 14. Referring to FIGS. 3-5, the slot 64 defines a first side 80 and a second side 82 extending between the first and second ends 66, 68 of the slot 64. Referring to FIGS. 3, 5-8, a wall 84 may be positioned on at least one of the first and second sides 80, 82 of the slot 64. Referring to FIGS. 3, 5-8, the wall 84 defines a ramp surface 86.

Figure 6:
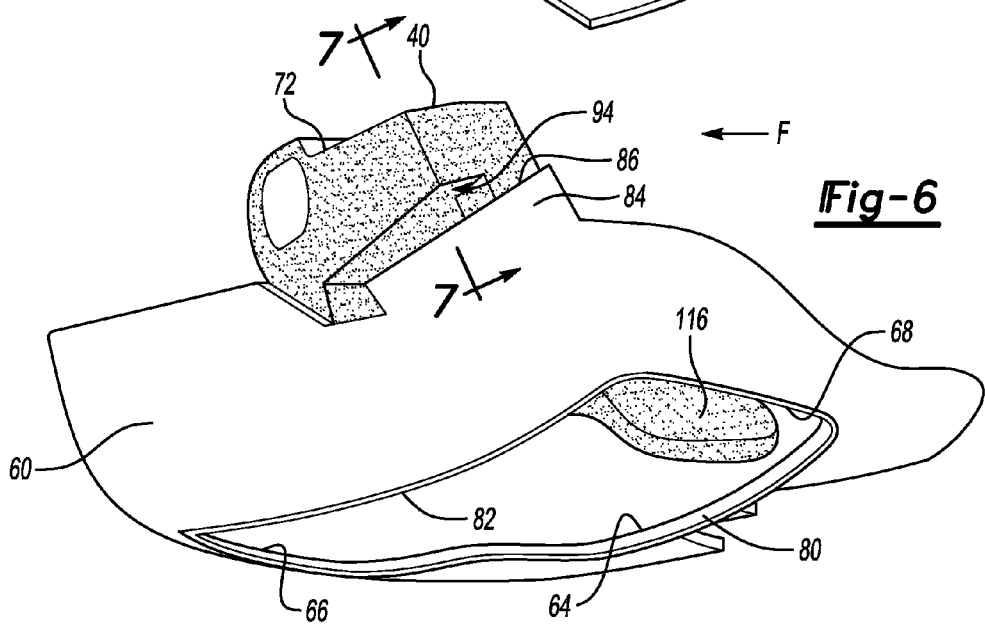
FIG. 6 is a schematic fragmentary perspective view of the lever and member of FIG. 1, shown from the opposite side of FIG. 5.

FIG. 6 is a schematic fragmentary perspective view of the lever 40 and member 60 after the first force F is applied to the steering column 14, shown from the side of the member 60 closer to the wall 84 (FIG. 5 shows the view from the side of the member 60 away from the wall 84). As previously noted, the lever 40 is shaded for clarity in FIGS. 4-6.

Figure 7:
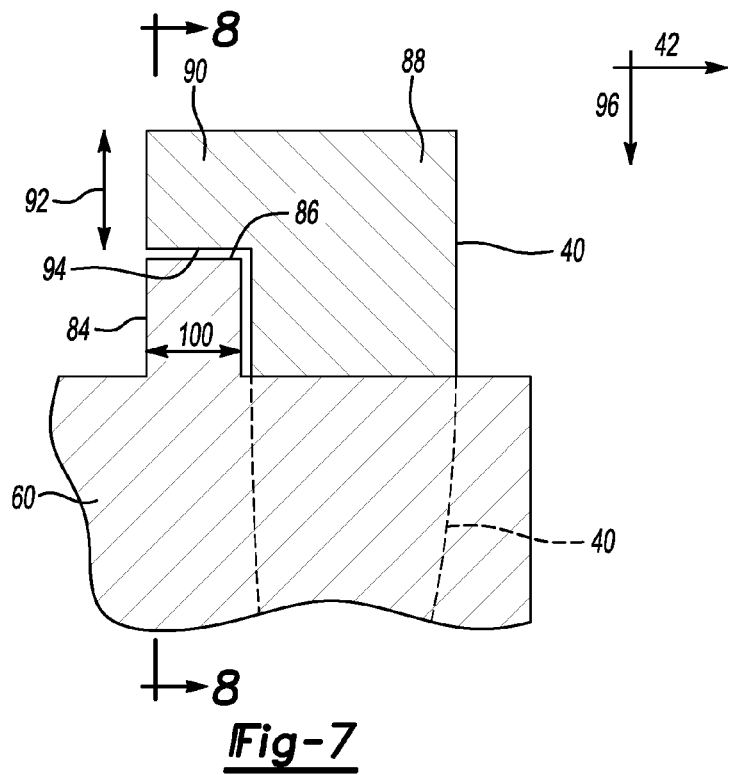
FIG. 7 is a schematic fragmentary sectional view taken along axis 7-7 of the lever and member shown in FIG. 6.

FIG. 7 is a schematic fragmentary sectional view of the lever 40 and member 60, taken along axis 7-7 of FIG. 6.

Referring to FIGS. 6-7, the lever 40 may include a base portion 88 and an extended portion 90 contiguous with the base portion 88. The extended portion 90 defines an extension height 92 smaller than a height of the base portion 88. The extended portion 90 defines a first lever surface 94.

Figure 8:
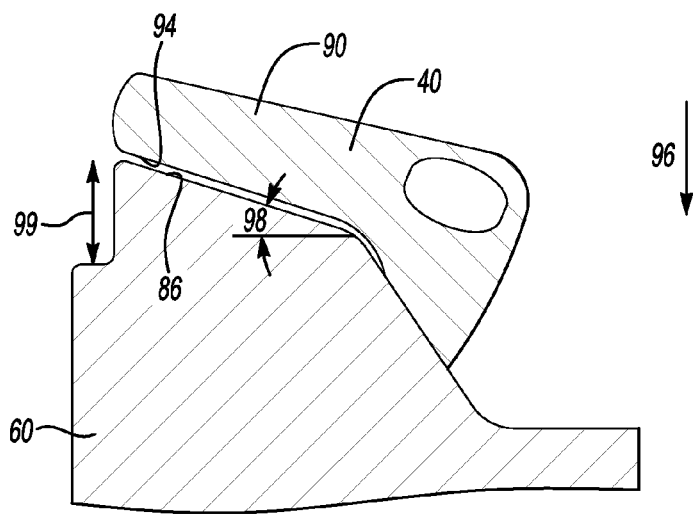
FIG. 8 is a schematic fragmentary sectional view taken along axis 8-8 of the lever and member shown in FIG. 7.

FIG. 8 is a schematic fragmentary sectional view of the lever 40 and member 60, taken along axis 8-8 of FIG. 7. Referring to FIGS. 7-8, the ramp surface 86 is configured to abut the first lever surface 94 of the lever 40 when the first force F is applied to the steering column 14, thereby preventing motion of the lever 40 in a first direction 96 substantially perpendicular to the pivot axis 42. In the embodiment shown, the first direction 96 is the vehicle down direction (vertically).

Referring to FIG. 8, the wall 84 defines a wall height 99. The wall 84 is angled such that the wall height 99 is a maximum at the second end 68 of the slot 64 and a minimum towards the first end 66 of the slot 64. Referring to FIG. 8, the wall 84 defines a ramp angle 98 relative to the column axis 20. In one non-limiting example, the ramp angle 98 is approximately between 5 and 30 degrees. In one non-limiting example, the wall height 99 at the second end 68 of the slot 64 (or maximum wall height 99) is between approximately 5 and 15 mm. Referring to FIG. 7, the wall 84 defines a wall width 100. In one non-limiting example, wall width 100 is between approximately 3 and 5 mm. The dimensions may be adjusted based on the particular application at hand.

In summary and referring to FIG. 1, the member 60 is configured as an anti-unlocking device for trapping the lever 40 in the locked position 46 when a sufficient first force F (i.e. a sufficiently high stroke) is applied to the steering column 14. This allows the energy absorbing device (not shown) in the assembly 10 to function optimally as well as ensuring proper alignment of the steering column 14. The minimum amount of force F required may be varied based on the particular application at hand.

Referring to FIGS. 7-8, the member 60 is tunable as to the magnitude of the force F required to trap the lever 40 in the locked position 46, i.e., how early or late the ramp surface 86 engages with the first lever surface 94 to prevent the lever 40 from motion in a first direction 96 substantially perpendicular to the pivot axis 42. A ramp surface 86 with a greater ramp angle 98 will engage the first lever surface 94 faster at the same amount of first force F as would a lower ramp angle 98. Stated differently, a ramp surface 86 with a greater ramp angle 98 will engage the first lever surface 94 with a lesser magnitude of the first force F as would a ramp surface 86 with a lower ramp angle 98. The strength of the member 60, i.e., how strongly the lever 40 is trapped in the locked position 46, is tunable by the choice of materials used in making the member 60 as well as by altering the width 100 (see FIG. 7) of the ramp surface 86, adding strengthening ribs or steel inserts into the wall 84 and other factors.

Referring now to FIG. 5, in one embodiment, the lever 40 may be spaced from the second end 68 of the slot 64 after the first force F is applied to the steering column 14, as illustrated by the first impact lever position 72. After a second force (such as a second impact in a collision) is applied to the steering column 14, a portion 76 of the lever 40 may abut the second end 68 of the slot 64, as illustrated by the second impact lever position 74. Note that the lever 40 in both the first and second impact lever positions 72, 74 are prevented from moving to the unlocked position 44 (shown in phantom in FIG. 1), as long as the ramp surface 86 is abutting the first lever surface 94 of the lever 40, thereby preventing motion of the lever 40 in a first direction 96 substantially perpendicular to the pivot axis 42. Alternatively, referring to FIG. 5, the portion 76 of the lever 40 may abut the second end 68 of the slot 64 after just the first force F is applied to the steering column 14, as illustrated by the second impact lever position 74. In other words, the initial force may be strong enough to move the member 60 relative to the lever 40 such that lever 40 abuts the second end 68 of the slot 64.

Referring to FIG. 3, the first side 80 of the slot 64 may define a first segment 102, second segment 104 and a third segment 106, the second segment 104 being contiguous with the first and second segments 102, 106. However, the slot 64 may be formed with any shape, size or configuration suitable for the particular application at hand. In the embodiment shown, the first and third segments 102, 106 may be substantially flat relative to the column axis 20 and the second segment 104 may be substantially angled relative to the column axis 20.

Referring to FIG. 3, the second side 82 of the slot 64 may define the wall 84, a fourth segment 108 and a fifth segment 110. The fifth segment 110 may be substantially flat relative to the column axis 20 and the wall 84 and the fourth segment 108 may be substantially angled relative to the column axis 20.

Referring to FIGS. 1 and 4, the lever 40 may define a first arm portion 112, a second arm portion 114 and a thumb or finger pad portion 116. Referring to FIG. 1, the second arm portion 114 may be substantially angled relative to the first arm portion 112. Referring to FIG. 4, the second arm portion 114 of the lever may include a chamfered edge 118 configured to guide the second arm portion 114 through the slot 64. However, it is to be noted that the lever 40 may be formed with any shape, size or configuration suitable for the particular application at hand.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A steering column assembly comprising:
a steering column having an adjustable column position and defining a column axis;
a lever operatively connected to the steering column, the lever being moveable between an unlocked position and a locked position;
wherein the column position is adjustable when the lever is in the unlocked position and wherein the column position is fixed when the lever is in the locked position;
an anti-unlocking device including a member operatively connected to the steering column;
wherein the member defines a slot having a first end and a second end, the lever being at least partially insertable into the slot in both the unlocked position and the locked position;
wherein the member is configured to move relative to the lever when a sufficient first force is applied to the steering column, thereby preventing the lever from moving to the unlocked position from the locked position.

2. The assembly of claim 1, wherein the column position of the steering column is adjustable in a direction substantially perpendicular to the column axis.

3. The assembly of claim 1, wherein the column position of the steering column is adjustable in a direction substantially parallel to the column axis.

4. The assembly of claim 1, wherein the second end of the slot is narrower than the first end of the slot, thereby preventing motion of the lever in a direction substantially parallel to the pivot axis.

5. The assembly of claim 1, wherein the slot defines a first side and a second side extending between the first and the second end of the slot, and further comprising:
    a wall positioned on at least one of the first and second sides of the slot;
    wherein the wall defines a ramp surface configured to abut at least one surface of the lever when the first force is applied to the steering column, thereby preventing motion of the lever in a direction substantially perpendicular to the pivot axis.

6. The assembly of claim 5, wherein the wall defines a ramp angle relative to the column axis and wherein the ramp angle is approximately between 5 and 30 degrees.

7. The assembly of claim 5, wherein:
    the first side defines a first segment, second segment and a third segment, the second segment being contiguous with the first and third segments;
    the first and third segments are substantially flat relative to the column axis and the second segment is substantially angled relative to the column axis;
    the second side defines a fourth segment and a fifth segment;
    the fifth segment is substantially flat relative to the column axis and the fourth segment is substantially angled relative to the column axis.

8. The assembly of claim 1, wherein the lever is spaced from the second end of the slot after the first force is applied to the steering column; and a portion of the lever abuts the second end of the slot after a second force is applied to the steering column.

9. The assembly of claim 1, wherein a portion of the lever abuts the second end of the slot after the first force is applied to the steering column.

10. The assembly of claim 1, wherein:
    the lever includes a base portion and an extended portion contiguous with the base portion, the extended portion defining an extension height smaller than a height of the base portion; and
    the extended portion defines a first lever surface configured to abut a ramp surface of the member when the first force is applied to the steering column, thereby preventing motion of the lever in a direction substantially perpendicular to the pivot axis.

11. The assembly of claim 1, wherein:
    the lever defines a first arm portion, a second arm portion and a thumb portion, the second arm portion being substantially angled relative to the first arm portion; and
    wherein the second arm portion of the lever includes a chamfered edge configured to guide the second arm portion through the slot.

12. The assembly of claim 1, further comprising:
    a locking bolt operatively connected to the lever;
    at least one cam member operatively connected to the locking bolt;
    at least one pair of opposing teeth configured to engage when the lever is rotated to the locked position and disengage when the lever is rotated to the unlocked position; and
    a spring operatively connected to the steering column to provide a biasing force to either engage or disengage the at least one pair of opposing teeth.

13. An anti-unlocking device for a steering column, the device comprising:
    a member operatively connected to the steering column, the steering column having a column position at least partially adjustable with a lever moveable between an unlocked position and a locked position;
    wherein the member defines a slot having a first end and a second end, the lever being at least partially insertable into the slot in both the unlocked position and the locked position; and
    wherein the second end of the slot is narrower than the first end of the slot.

14. The device of claim 13, wherein the slot defines a first side and a second side extending between the first end and the second end of the slot, and further comprising:
    a wall positioned on at least one of the first and second sides of the slot;
    wherein the wall defines a ramp surface configured to abut at least one surface of the lever when a sufficient first force is applied to the steering column.

15. The device of claim 13, further comprising:
    a shroud integrally formed with the member, the shroud being configured to at least partially encapsulate the steering column.

16. The device of claim 13, in combination with the lever and steering column, wherein the steering column defines a column axis.

17. The device of claim 16, wherein:
    the first side defines a first segment, second segment and a third segment, the second segment being contiguous with the first and third segments;
    the first and third segments are substantially flat relative to the column axis and the second segment is substantially angled relative to the column axis;
    the second side defines a fourth segment and a fifth segment; and
    the fifth segment is substantially flat relative to the column axis and the fourth segment is substantially angled relative to the column axis.

18. A vehicle comprising:
    a steering column having an adjustable column position and defining a column axis;
    a lever operatively connected to the steering column, the lever being moveable between an unlocked position and a locked position about a pivot axis;
    wherein the column position is adjustable when the lever is in the unlocked position and wherein the column position is fixed when the lever is in the locked position;
    a member operatively connected to the steering column and defining a slot having a first end, a second end and at least one side, the lever being at least partially insertable into the slot in both the unlocked position and the locked position;
    wherein the member is configured to move relative to the lever when a sufficient first force is applied to the steering column;
    a wall positioned on the at least one side of the slot; and
    wherein the wall defines a ramp surface configured to abut at least one surface of the lever when the first force is applied to the steering column, thereby preventing motion of the lever in a direction substantially perpendicular to the pivot axis.

* * * * *